United States Patent [19]

Hutton, Sr.

[11] 4,007,336

[45] Feb. 8, 1977

[54] CLASS OF CALL DISCRIMINATING TRUNK CIRCUIT

[75] Inventor: Robert Wayne Hutton, Sr., Oaklawn, Ill.

[73] Assignee: Western Electric Company, Inc., New York, N.Y.

[22] Filed: Feb. 24, 1976

[21] Appl. No.: 660,938

[52] U.S. Cl. .......................... 179/18 AH; 179/7 R
[51] Int. Cl.² .................. H04M 7/00; H04M 15/16
[58] Field of Search ............. 179/18 D, 18 AH, 7 R

[56] References Cited
UNITED STATES PATENTS

| | | | |
|---|---|---|---|
| 2,803,706 | 8/1957 | Althouse | 179/18 AH |
| 3,226,479 | 12/1965 | Rust | 179/7 R |

*Primary Examiner*—William C. Cooper
*Attorney, Agent, or Firm*—Charles H. Davis

[57] ABSTRACT

A communication system is disclosed for providing itemized telephone subscriber billing of special assistance calls. A local office not equipped with automatic message accounting facilities is interconnected via a trunk circuit to another exchange having such facilities and thence to a special assistance bureau. The trunk circuit is accessible by the local office for both message rate billed and special assistance classes of traffic. On each call therethrough, the trunk circuit translates subscriber dialed digits for selecting the automatic accounting facilities or message rate billing apparatus in the local office in accordance with whether the call is of a special assistance or local toll call class as defined by the digits.

19 Claims, 2 Drawing Figures

CLASS OF CALL DISCRIMINATING TRUNK CIRCUIT

BACKGROUND OF THE INVENTION

My invention relates to telephone switching systems generally and, more particularly, to telephone subscriber billing circuits and trunk circuitry for selection thereof for particular classes of calls.

In the telephone industry, subscriber billing for toll classes of calls is commonly performed by automatic message accounting (AMA) facilities located at a telephone exchange or by means of bulk-billing circuits for message or flat rate service in exchanges where AMA facilities are not economically justified. AMA facilities are now available for virtually every call that is routed via the direct distance dialing, or DDD, network. These DDD calls are initiated by the dialing of three digits designating a numbering plan area, or area code, three digits defining a terminating exchange in the numbering plan area and four subscriber identification digits. These 10 digits may also be preceded by an initial prefix digit 0 or 1 in certain cases.

On DDD calls, the AMA facilities are typically provided at an intermediate exchange through which the toll calls are switched enroute to the terminating exchange and consist of control of storage circuitry for the recording of detailed call information. In order to identify a call originator for billing purposes, it is common to provide automatic number identification, or ANI, apparatus at the originating exchange for identifying a call originator, and automatic circuitry at the intermediate exchange for communicating with this apparatus to obtain the subscriber identification information for the AMA facilities.

Many toll calls also originate and terminate within the same numbering plan area and are not processed through the DDD network. These calls may originate in a local exchange in which AMA facilities are provided and detailed itemized billing is provided the subscriber on a per call basis. In many small local exchanges, such as community dial offices, it is not economically feasible to provide AMA facilities and the local toll traffic is commonly bulk billed by flat rate or message rate service. Flat rate billing involves the imposition of a fixed subscriber charge for all calls which terminate within a designated area during a prescribed billing interval. In message rate billing, a subscriber is billed on the basis of usage of facilities as measured by message units accumulated in a message register uniquely associated with a subscriber's station. A disadvantage of message rate billing is the inability to distinguish between classes of toll calls and the inability to provide a subscriber with an itemized bill for each toll call.

With the advent of toll tariffs applicable to new classes of calls, such as for directory assistance, further difficulties arise concerning local small exchanges not equipped with AMA facilities. These call classes must either be billed by means of message rate circuits in the local exchange or routed via another exchange equipped for itemized subscriber billing. The message rate billing is undesirable, firstly, in that special assistance calls cannot be distinguished from other toll classes by means of message units and, therefore, cannot be separately billed. Secondly, tariffs for special assistance calls may require the offering of an initial predetermined number of such calls which are toll free. Message rate billing precludes this offering except by means of blanket deductions of an appropriate number of message units from those accumulated by each subscriber without regard to the number of special assistance calls made by each.

The routing of special assistance traffic via exchanges having AMA facilities also presents difficulties. The identification of such calls in each local exchange for the purpose of effecting the desired routing may involve the provision of additional local switching facilities to identify the call class. In a step-by-step exchange, for example, additional selectors may be required for decoding the special assistance call digits. Furthermore, this solution undesirably requires the provision and expense of small inefficient trunk groups extending from each local office to the AMA exchange for the handling of only special assistance traffic.

SUMMARY OF THE INVENTION

My invention solves the foregoing problems in a novel and useful manner. In accordance with one embodiment of the invention, I provide a communication system comprising subscriber stations, first billing circuits for billing a first class of call, second billing circuits for billing a second class of call, and a trunk circuit for serving both classes of calls and having trunk circuitry responsive to subscriber dialed digits for selecting either the first or second billing circuits in accordance with the dialed digits defining the class of call.

In an exemplary preferred embodiment, the aforementioned trunk circuit is for interconnecting a local telephone exchange with another exchange which has access to AMA facilities both for bulk-billed local toll traffic and for special assistance traffic to be billed by the AMA facilities.

A feature of my invention resides in the provision of trunk circuitry operative for selecting from alternatives particular billing circuits in accordance with the class of call being served.

Another feature of my invention is the provision of a trunk circuit for interconnecting the local and other exchange for separate classes of calls to be billed by separate billing circuits.

Still another feature of my invention is the provision of trunk circuitry operative for distinguishing between the separate classes of calls on the basis of digits dialed by a calling subscriber.

A further feature of my invention is the provision of trunk circuitry operative for translating subscriber dialed digits in order to ascertain the class of a call.

As will be seen, an advantage of my invention is that provision is made for the itemized billing of special assistance calls and, importantly, without requiring the need of additional originating exchange switching facilities or additional trunk groups solely for handling the special assistance traffic.

BRIEF DESCRIPTION OF THE DRAWING

A better understanding of the foregoing features and advantages will become more apparent upon a reading of the following description in conjunction with the drawing in which.

DETAILED DESCRIPTION

Figure 1:
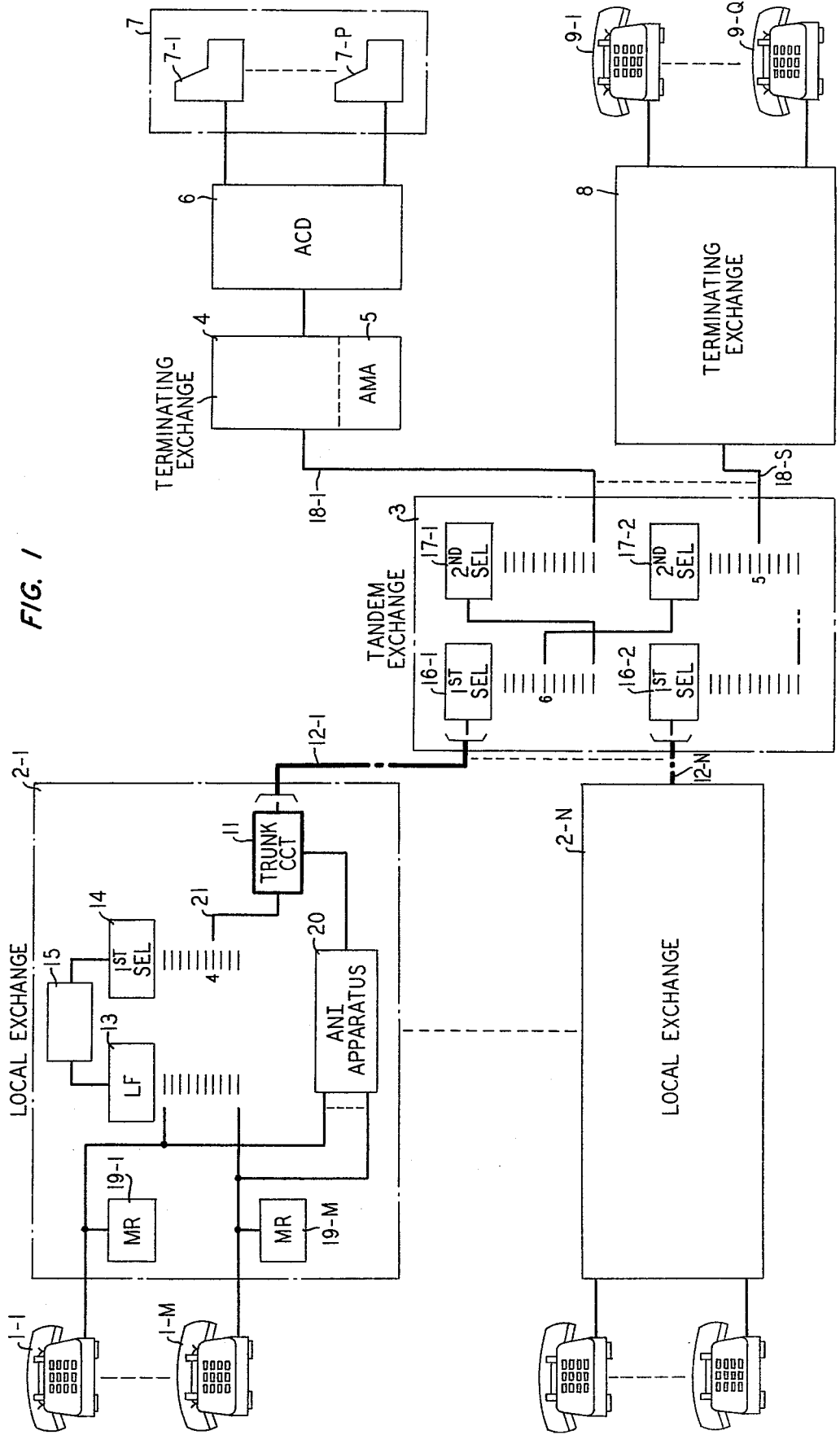
FIG. 1 illustrates in block diagram form a preferred embodiment for a practice of the invention in the form of a telephone communication system.

The communication system of FIG. 1 operates for processing different classes of toll calls which because of their nature are made subject to subscriber billing by different billing circuits within the communication system. Specifically, in this illustrative embodiment, we are concerned with the processing and billing of a class composed of special assistance calls defined by the digit sequence "x–1–1", such as a "4–1–1" call for directory assistance, and of the class of toll calls which must be billed by bulk-billing circuits at the office of origination. Thus, for example, the system of FIG. 1 operates for processing calls from subscribers such as 1-1 to 1-M, which are served by the local telephone exchange 2-1, and other subscribers such as those served by exchange 2-N. These calls may be to, for example, subscribers 9-1 to 9-Q served by a terminating exchange 8 located within the same numbering plan area as exchangers 2-1 to 2-N. The calls are routed via trunk groups 12-1 to 12-N from each of the local exchanges to the destination exchange via a tandem exchange 3. Additionally, the subscribers such as 1-1 to 1-M may place special assistance calls to an assistance bureau 7 consisting of operator positions 7-1 to 7-P.

The bureau 7 is arranged to be accessed through an automatic call distributor (ACD) 6 which, in turn, is accessed via an exchange 4 equipped with AMA facilities 5. It would be possible to route special assistance calls from each local exchange directly to exchange 4. However, as mentioned, this would require separate, dedicated and inefficient trunk groups from each local exchange to exchange 4 for the handling of only this class of traffic. In this preferred embodiment, these calls are instead routed via the existing trunk groups 12-1 to 12-N to tandem exchange 3 where successive call digits result in connections to exchange 4.

For a local toll class of call, such as to exchange 8, the originating subscriber must necessarily be billed by bulk-billing circuits in the originating exchange since that exchange, the terminating exchange 8, and the tandem exchange 3 through which the call is processed are not equipped with AMA facilities. For the special assistance class of call, however, itemized subscriber billing is provided by the AMA facilities 5 in exchange 4. The AMA facilities 5 operate to store detailed billing information for the special assistance calls and to communicate with the originating exchanges, such as 2-1, for obtaining calling subscriber identification information for completing its call information. The call information stored by the AMA facilities 5 is processed off-line at a later time by data processing apparatus for generating subscriber bills. At that time the processig apparatus may deduct from a subscriber's bill the charges for an initial fixed number of special assistance calls which may be offered toll free.

As mentioned, both of the foregoing classes of calls are routed via common truck groups 12-1 to 12-N to the tandem exchange 3. The individual trunks connect to a local exchange trunk circuit such as trunk circuit 11. For ascertaining the call class, trunk circuit 11 operates after a seizure thereof for translating the subscriber dialed digits transmitted to exchange 3. Thereafter, in response to a supervisory signal from the terminating exchange 4 or 8, trunk circuit 11 operates for selecting either the bulk-billing circuits of the local exchange 2-1 or the AMA facilities of exchange 4 in accordance with the particular call class.

Although my invention is described in the embodiment of FIG. 1 comprising local, tandem, and terminating exchanges, it is emphasized that such an embodiment is not essential for a practice of the invention. Indeed, situations may arise in which it is desirable to select alternatives of billing circuits within a single switching exchange by means of a trunk circuit call class translation and such is deemed to be within the scope of my invention. It is further emphasized that the embodiment of FIG. 1 is chosen for convenience only and that, for example, the tandem and terminating exchanges might consist of a single switching entity.

For purposes of the exemplary embodiment, we are concerned with the processing of directory assistance calls identified by the digits "4–1–1" and of bulk-billed toll calls. These classes are merely illustrative and any other desired call classes could be defined as well.

Assume that subscriber 1-1 served by exchange 2-1 wishes to place a toll call to subscriber 9-1 located in the same numbering plan area and served by exchange 8. Assume further that exchange 8 is identified by the digits "4–6–5", which are the initial digits to be dialed by subscriber 1-1. In response to an off-hook signal from subscriber 1-1, a line circuit (not shown) in exchange 2-1 activates a linefinder 13 which proceeds to cut-through the subscriber to an idle first selector 14. The subscriber then dials the initial digit "4" which steps the selector 14 to its fourth level. The selector hunts horizontally at its fourth level for an idle trunk and cuts-through for effecting a seizure of an idle trunk circuit 11. As a result of the trunk seizure, a first selector 16-1 in the tandem exchange 3 is seized preparatory to receiving the remaining digits from the originator.

At this point in the call, it is not known whether the subscriber 1-1 is executing a special assistance call identified by the digit sequence "4–1–1" or a call to a subscriber such as one served by the exchange 8, since both calls are initiated by the digit 4. As successive digits are outpulsed to the tandem exchange 3, trunk circiut 11 translates those digits for ascertaining the call class and for subsequently selecting the billing circuits applicable to the call.

In the example under discussion, the outpulsed digits "6" and "5" are processed in respective first and second selectors 16-1 and 17-2 in exchange 3 for seizing an outgoing trunk 18-S to the terminating exchange 8. The remaining four digits from subscriber 1-1 identifying station 9-1 are routed via the established connections to exchange 8 wherein additional switching operations establish a connection to station 9-1 for applying ringing signals to the station line. Assuming that the subscriber at station 9-1 responds to the ringing signals by removing his handset, exchange 8 detects the off-hook signal and returns a supervisory signal via the established call connections for operating the bulk-billing circuits of the local exchange 2-1. The signal is received by trunk circuit 11, which has previously identified this call for bulk-billing in the local exchange, and responds thereto by returning a signal via the local exchange 2-1 call connections to activate a bulk-billing supervisory circuit 15. Circuit 15, in turn, operates for transmitting one or more incrementing pulses via the linefinder 13 to a message register 19-1, individually associated with the calling subscriber station 1-1, wherein message unit information is accumulated for billing the subscriber.

In contradistinction to the above, should the subscriber at station 1-1 place a directory assistance class of call by dialing the digits "4–1–1", the trunk circuit 11 is seized upon the dialing of the initial digit 4 and the selectors 16-1 and 17-1 of exchange 3 operate upon the remaining digits "1–1" for extending the call to exchange 4. Trunk circuit 11 translates the digits as they are outpulsed and identifies the special assistance class of call.

Exchange 4 recognizes this call as destined for the directory assistance bureau 7 by virtue of the particular trunk 18-1 on which the call arrives and operates to extend the call to the assistance bureau 7 by means of the call distributor 6. Before the call is extended, however, exchange 4 activates its AMA facilities 5 for accumulating itemized billing information. The AMA facilities 5 return a supervisory signal via the established call connections to the exchange 2-1 for requesting a transmittal of calling subscriber identification information. Trunk circuit 11 responds to the signal as a result of its prior call class identification for selecting the automatic number identification (ANI) apparatus 20, rather than for activating the message register control circuit 15 and message register 19-1.

The ANI apparatus 20 operates in a conventional fashion for ascertaining the directory number of station 1-1 and for transmitting this information via trunk circuit 11 to the exchange 4 and AMA facilities 5. The exchange 4 after receiving the information, operates for completing the call via the call distributor 6 to the special assistance bureau 7.

The details of operation of exchange 2-1, including the selector 14, supervisory circuit 15, message register 19 and the ANI apparatus 20 are well known and further detailed explanation of their operations is not necessary for an understanding of my invention. Similarly, the details of operation of the exchanges 3, 4 and 8, and of the AMA facilities 5 and ACD 6 are also well known. The terminating exchange 4 might, for example, consist of an electronic switching exchange, such as disclosed in the Bell System Technical Journal (September 1964). Alternatively, exchange 4 might consist of a traffic service position system such as disclosed in U.S. Pat. No. 3,484,560 to R. J. Jaeger, Jr. et al on Dec. 4, 1969, or any other well known type of telephone exchange. The reader is referred to Aitken, W., *Automatic Telephone Systems*, Vol 3 (1924), for a detailed description of certain exchanges pertaining to this invention and including a discussion of message rate billing circuits therefor. A disclosure of automatic number identification apparatus is in U.S. Pat. 3,071,650 which issued to H. D. Cahill et al on Jan. 1, 1963. An automatic call distributor system is described briefly in Kahn, "Redesigned ACD Improves Directory Assistance Service," Bell Laboratories Record 197 (April 1975).

The remaining detailed description is confined to trunk circuit 11.

Figure 2:
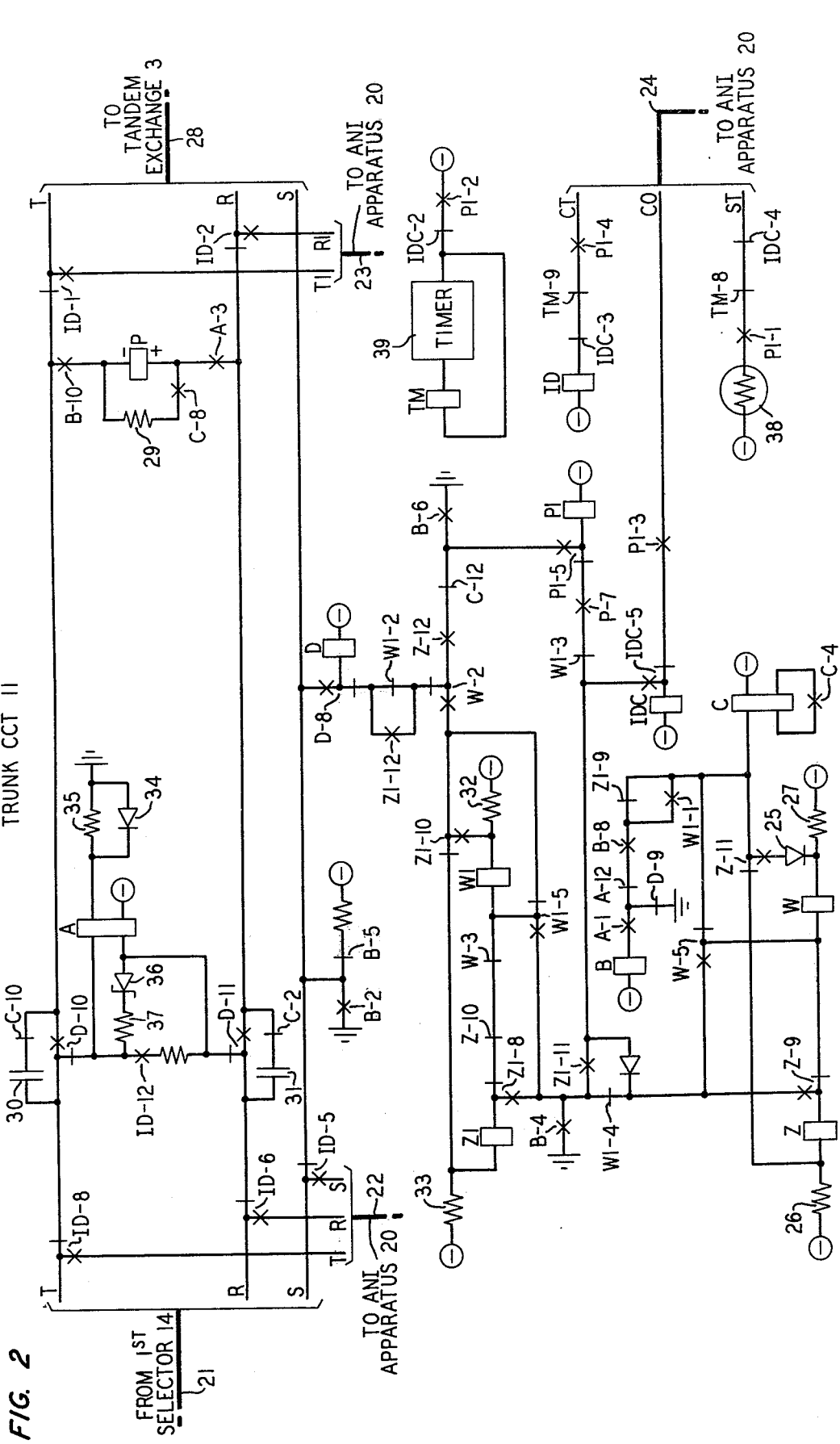
FIG. 2 contains the details of an exemplary trunk circuit for implementing the foregoing inventive features and advantages.

The circuit details of trunk circuit 11 are illustrated in FIG. 2. The tip (T), ring (R) and sleeve (S) leads of cable 21 connect to the first selector 14 of FIG. 1. On the right of FIG. 2 is shown the tip (T) and ring (R) connections to an associated trunk 28 of a trunk group such as 12-1 in FIG. 1. The incoming T, R and S and the outgoing T and R leads may be connected to the ANI apparatus 20 of FIG. 1 via the cables 22 and 23 in FIG. 2. In addition, three control leads extend to apparatus 20 from trunk circuit 11 via cable 24.

Trunk circuit 11 comprises a number of trunk relays such as a digit repeating relay A, a seizure relay B, an execute relay C and a cut-through relay D. Additionally, other relays and circuitry operate, as will be described, for translating, or ascertaining, the value of a prescribed number of initial digits to determine the class of a call in progress. There relays operate other circuitry for enabling connections between the outgoing trunk 28 and the cables 21 and 23 for selecting one of alternate billing systems in accordance with the call class.

The foregoing translating relays include relays W, Z, W1 and Z1. The W and Z relays operate for counting the number of digit pulses for each of the initial two digits received and outpulsed to the tandem exchange 3 to ascertain if the digit sequence "1—1" for a special assistance class of call has been dialed. The W1 and Z1 relays operate for identifying which of the initial two digits is in the process of being received. Selecting circuitry comprising logical combinations of contacts of the foregoing relays control the operation of the cut-through relay D and other relays, to be described, for selecting the billing circuit applicable for a call.

For the purpose of understanding the operation of trunk circuit 11, assume that the trunk circuit is in an idle state with all of its relays released. Assume further that a calling subscriber at station 1-1 is placing a call to a subscriber at station 9-1 served by exchange 8 in FIG. 1 and which exchange is identified by the digits "4–6–5". As explained earlier, after the dialing of the initial digit 4, the first selector 14 in exchange 2-1 effects the seizure of trunk circuit 11. As a result, relay A is operated via a path consisting of its lower and upper coils, break contacts D-10 and D-11 of relay D, break contacts ID-8 and ID-6 of relay ID and the established subscriber loop connection. The operation of relay A causes the operation of slow release relay B through an obvious path consisting of a voltage source, the relay B coil, make contact A-1, and break contact D-9 to ground. This completes the seizure of the trunk circuit. The operation of relay A also effects a seizure of a conventional trunk repeater (not shown) located between trunk circuit 11 and tandem exchange 3 by completing the outgoing tip and ring loop connection through make contact B-10, polar relay P and make contact A-3. Relay P does not operate as a result of the loop closure. The repeater returns a ground potential on the sleeve lead for maintaining the exchange 2-1 call connections.

The next digit to be dialed by the subscriber is the digit "6", upon the receipt of which it becomes apparent that a special assistance call is not in progress. In this exemplary embodiment, the trunk circuit 11 operates immediately after receipt of the digit "6" to operate the cut-through relay D for establishing a direct connection between the T and R leads of the outgoing trunk 28 and the T and R leads of cable 21 to the first selector. As will become apparent, this connection operates for selecting the bulk-billing circuits 15 and 19-1 of the local exchange for effecting the billing of this call.

Upon the arrival of the first digit pulse of the foregoing digit "6", the A relay is released because of the opening of the subscriber loop by the dial contacts of the subscriber handset. As a result, the C relay is operated by a path consisting of a voltage source, the upper coil of relay C, break contact Z1-9, make contact B-8, and break contacts A-12 and D-9 extending to ground. The operation of relay C activates its make contact C-4 which shunts the lower coil of relay C, causing the relay to acquire slow-release characteristics. Relay C will remain operated throughout the receipt of the remaining pulses of this incoming digit, releasing only after the pulses cease and break contact A-12 of repeating relay A is open for a sufficient interval of time. The operation of relay C also enables a path consisting of make contact B-10, resistor 29, and make contacts C-8 and A-3 by which the dialed digits are repeated to the tandem exchange 3 as the contact A-3 releases and reoperates in response to the digit pulses. The network consisting of diode 34 and resistor 35 is a standard arrangement inserted in the coil path of relay A for preventing what is known as belltapping, or the operation of the bell at the calling station in response to each of the digit pulses. The network consisting of zener diode 36 and resistor 37 connected across the dual coils of relay A is also a standard arrangement for improving the pulsing characteristics of the relay. The W relay is operated following the A relay release upon receipt of the first digit "6" pulse. The operate path extends from a voltage source through resistor 27, the W relay coil, break contacts W-5 and Z1-9, make contact B-8, and break contacts A-12 and D-9. The operation of relay W enables an operate path for relay Z. Specifically, the opening of break contact W-5 causes an interruption of a shunt path across the Z relay coil consisting of break contacts Z-11, W-5 and Z-9. The Z relay is held released, however, by a path which shunts the Z operating voltage to ground, consisting of resistor 26, break contacts Z-11 and Z1-9, make contact B-8 and break contacts A-12 and D-9. This shunt path is removed at the termination of the first digit "6" pulse by the opening of break contact A-12 caused by the reoperation of relay A. At this time, the Z relay operates via a path consisting of its operating voltage source, resistor 26, the Z relay coil, break contact Z-9, make contact W-5, break contact W1-4 and make contact B-4 to ground. Make contacts W-5 and Z-9 operate for holding the respective relays W and Z operated via the common path consisting of break contact W1-4 and make contact B-4 to ground.

As a result of the operation of the Z relay, the closure of make contact Z-11 prepares a release path for the W relay by enabling a bypass circuit for the operating voltage of relay W. The purpose of the bypass circuit is to release the W relay in the event another pulse of the incoming digit is received, which indicates that the received digit does not correspond to the digit 1 of a special assistance call. This bypass circuit consists of the diode 25, make contact Z-11, break contact Z1-9, make contact B-8 and break contacts A-12 and D-9. The bypass is not completed in time to cause a premature release of relay W before the arrival of a succeeding pulse. This is so because the break contact A-12 in the bypass circuit interrupts the bypass at the termination of the first pulse and before relay Z is operated for completing the bypass circuit. Immediately upon the receipt of the second digit "6" pulse, the foregoing bypass circuit is completed by the closure of break contact A-12 for causing the release of relay W. At this point, it is known that a special assistance call is not in progress and the digit translation of trunk circuit 11 is effectively complete. The successive digit pulses and digits have no further effect upon the state of relays W and Z. Relay Z is held operated via its holding path and W is maintained released by means of the path consisting of diode 25, make contact Z-11 and break contact W-5, which shunts the W relay coil.

The selection of the bulk-billing supervisory circuit 15 and message register 19-1 for billing of this call occurs upon the termination of the first digit. The selection is accomplished by the operation of the D cut-through relay for establishing a direct-coupled communication path between trunk 28 and cable 21 to the first selector of exchange 2-1 for passing supervisory signals to be received from the terminating exchange 8. Specifically, after receipt of the last pulse of the digit "6", the slow-release relay C releases because of the lengthy interruption of its operate path by the nonoperated break contact A-12. This causes the operation of the D relay via a path consisting of a voltage source, the D relay coil, break contacts D-8, W1-2 and W-2, make contact Z-12, break contact C-12, and make contact B-6 to ground. The aforementioned connection between trunk 28 and the first selector is established by means of the D relay make contacts D-10 and D-11, which are located in the tip and ring leads of the trunk circuit.

The operation of relay D interrupts the operate path of repeating relay A, which releases and causes the release of all other trunk circuit relays except D. The remaining digit "5" and the digits identifying the called subscriber in exchange 8 are transmitted directly to the outgoing trunk 28 by means of the operated make contacts D-10 and D-11. The translating relays W and Z and resultingly, the W1 and Z1 relays are isolated from effects of the digit pulses because of the operation of cut-through relay D, which opens the operate path to the translating relays via its break contact D-9. These digits are transmitted to the tandem exchange 3 as priorly described and are used by that exchange and the terminating exchange 8 to complete call connections to the desired called station 9-1.

Assuming that the subscriber at station 9-1 responds to this call by going off-hook, the terminating exchange 8 generates a supervisory signal in the form of a reversal of trunk potential which is received by trunk circuit 11 on the T and R leads of trunk 28. The polarity reversal is passed directly through trunk circuit 11 via the cut-through relay D contacts D-10 and D-11 to the first selector of the local exchange 2-1 for activating the supervisory circuit 15 in FIG. 1. Supervisory circuit 15 then operates for incrementing the message register 19-1 associated with the calling subscriber for the purposes of billing him for this call.

Assume now that a special assistance call is in progress and that trunk circuit 11 is in an idle state with all relays released. Trunk circuit 11 is seized by the first selector 14 upon the dialing of the first digit 4 of the digits "4–1–1" which identify the call. After seizure and during the receipt of the first digit "1", the operations of the trunk circuit relays are similar to those described earlier with respect to the receipt of the digit "6". In this example, however, the C relay is released after receipt of the single and only pulse of the digit "1" and the W relay does not have an opportunity to be released by the receipt of a second digit pulse. The W1 relay is now operated for storing the fact that a first digit "1" was received. The operating path for the W1 relay consists of a voltage source, resistor 32, coil W1, break contact W1-5, make contact W-2, make contact Z-12, break contact C-12, and make contact B-6 to ground. Both the Z and W relays are next released to prepare them for translating the value of the next digit to be received. The release of the Z and W relays is effected by interrupting their holding path by the operation of relay W1 via its break contact W1-4. Finally, in preparation for receipt of the next digit, the Z1 relay is operated via a path consisting of a voltage source, resistor 33, the relay coil Z1, break contacts Z1-8, Z-10, W-3, make contact W1-5, and make contact B-4 to ground. The D cut-through relay is held released at this time, since it is not yet known whether or not the call in progress is for special assistance. That determination depends upon the value of the next digit which is received.

The receipt of the next digit "1", establishes that a special assistance call is in progress. The operations of the W and Z relays during the receipt of the digit pulse are the same as described for the first digit "1". Thus, at the termination of the receipt of this digit, the W and Z relays are operated, the C relay is released and the W1 and Z1 relays are operated as a result of the first digit "1" which was received. At this time, the W1 relay releases to prepare for the selection of the ANI apparatus 20 to complete the billing information stored by the AMA facilities 5 of the terminating exchange 4. The release of relay W1 occurs due to the bypass of its operating voltage via the path consisting of resistor 32, make contacts Z1-10, W-2 and Z-12, break contact C-12 and make contact B-6 to ground. Trunk circuit 11 now awaits the return of a supervisory signal from the exchange 4. In order to insure that the states of the translating relays W, Z, W1 and Z1 are not disturbed in the event the subscriber should inadvertently dial another digit, the control path for these relays is interrupted by the make contact W1-1 and break contact Z1-9.

At this point, it is convenient to digress for a moment to explain the operation of trunk circuit 11 in the event the second digit received by trunk circuit 11 be other than the digit "1". Specifically, assume that the calling subscriber dials the sequence "4–1–6". The receipt of the digit "1" prepares the trunk circuit 11 to examine the next digit for the value "1" as just described. The digit "6" actually received by trunk circuit 11 distinguishes the call as other than a special assistance call and the D cut-through relay is operated for selecting the exchange 2-1 bulk-billing circuits. Specifically, the W and Z relays operate to translate the digit "6" as already described and at the termination of receipt of the digit pulses the W relay is released, the Z relay is operated and the C relay is released. The relay Z1 is already in an operated state as a result of the reception of the prior digit "1". This combination of relay states causes the operation of cut-through relay D. The operate path for the D relay consists of a voltage source, the D relay coil, break contact D-8, make contact Z1-12, break contact W-2, make contact Z-12, break contact C-12, make contact B-6 and ground.

To return to the example in question, the tandem exchange 3 extends the call connections to terminating exchange 4 in response to the digits "1—1". Exchange 4 recognizes that this is a special assistance call because of the particular trunk on which the call arrives and, in response, returns a supervisory signal requesting transmission of subscriber identification information. The receipt of the supervisory signal rsults in the operation of polar relay P in trunk circuit 11. Since the cut-through relay D is not operated for a special assistance class of call, only the capacitors 30 and 31 provide AC coupling between the cable 21 and outgoing trunk 28 and the supervisory signal is therefore not returned to the first selector 14 of the local exchange 2-1. The W1 and Z1 relays are respectively in released and operated states for causing an operation of relay P1 in response to the operation of relay P. The P1 operate path consists of a voltage source, the P1 relay coil, break contact P1-5, make contact P-7, break contact W1-3, and make contacts Z1-11 and B-4 to ground. As a result of the operation of P1, a start potential is applied to lead ST of cable 24 for activating a request for service to the ANI apparatus 20. This potential is applied through an obvious path consisting of ballast resistor 38, make contact P1-1 and break contacts TM-8 and IDC-4. The operation of P1 causes an activation of the timer 39, which is illustratively a 6-second timer in this exemplary embodiment, via make contact P1-2 and break contact IDC-2 for timing the maximum interval allowed for completion of operations by the ANI apparatus 20. The ANI apparatus may at this time be engaged in serving other requests from trunk circuits such as trunk circuit 11 and, accordingly, this request may have to await its turn for service. The ANI apparatus responds to the request for service by applying a ground potential to lead CT of cable 24 when it is ready to serve the request. The ground signal causes an operation of the identification-in-progress relay ID via the path consisting of make contact P1-4, and break contacts TM-9 and IDC-3. The operation of relay ID results in the transfer of the trunk circuit 11 incoming T, R and S leads from cable 21, and the outgoing T and R leads of trunk 28 to the respective cables 22 and 23 extending to the ANI apparatus 20. This transfer is accomplished by the make contacts ID-1, ID-2, ID-5, ID-6 and ID-8. The ANI apparatus 20 examines the T and R leads from cable 21 for the purpose of performing a party-line test and to ascertain if the calling subscriber has gone on-hook. To the S lead, the ANI apparatus applies a signal which is returned through the switching circuitry of the local exchange 2-1 to the point of appearance of the calling subscriber's line at the exchange for identifying the subscriber. The ANI apparatus locates the identifying signal at its exchange appearance and translates the appearance into the subscriber's directory number. Thereafter, the ANI apparatus 20 outpulses that number via cable 23 and trunk 28 to the AMA facilities 5 of the terminating exchange 4. The ANI apparatus 20 then grounds lead CO of cable 24 for operating the relay IDC via make contact P1-3 and break contact IDC-5. The operation of relay IDC informs trunk circuit 11 of the completion of subscriber identification operations. The IDC relay holds operated through its make contact IDC-5 and make contacts Z1-11 and B-4. As a result, the start potential to the ANI apparatus 20 is removed from lead ST because of the operation of break contact IDC-4. Also, the ID relay is released because of the operation of break contact IDC-3. Lastly, the operation of break contact IDC-2 deactivates the timer 39. As a result of removing the start potential, the ANI apparatus 20 releases from the connection and only trunk circuit 11 remains for communication between the local and terminating exchanges.

The completion of the foregoing identification operations are designed to occur within the timing interval established by timer 39 (6 seconds in this exemplary embodiment) in the absence of fault conditions. Timer 39 is activated by an operation of relay P1 at the time the ANI apparatus 20 responds to a request signal on lead ST. The timer is deactivated upon completion of the identification operations by the operation of relay IDC as described above. In the event the timing interval expires before completion of identification operations because of a fault or malfunction, the timing relay TM is operated by timer 39 to terminate the ANI apparatus 20 operations so that an operator identification may be performed. The operation of relay TM terminates identification operations specifically, by removing the start potential on lead ST of cable 24 by means of break contact TM-8. The relay ID is released via contact TM-9. Thereafter, timing circuits at exchange 4 will time-out and operate to access an operator for performing the identification.

The trunk circuit 11 is released by exchange 2-1 and made available for a new call when the originating subscriber at the exchange places his handset on-hook to terminate the call. If a special assistance call is in progress, the resulting interruption of the subscriber loop releases the A relay of the trunk circuit. The opening of make contacts A-1 and A-3 causes the release of respective relays B and P. The P1 relay is released by the opening of make contact B-6. The holding path for relay TM is interrupted by make contact P1-2. Finally, the make contact B-4 interrupts the holding path for the Z, W, Z1, W1 and IDC relays. If the call in progress is not for special assistance, the trunk repeater (not shown) between trunk circuit 11 and tandem exchange 3 is released as a result of the on-hook condition and removes a ground potential on the sleeve lead for causing the release of relay D. At this point, trunk circuit 11 is once again in an idle state and available for serving another call.

It is to be understood that the above described arrangement is merely illustrative of the application of the principles of this invention and that other arrangements may be devised by those skilled in the art without departing from the spirit and scope of the invention.

What is claimed is:

1. A communication system comprising
   subscriber stations,
   first means for billing individual ones of said stations for a first class of call established by said communication system,
   second means for billing individual ones of said stations for a second class of call established by said communication system,
   a trunk circuit adapted for connection to a calling one of said stations for both said first and second classes of calls, and
   means in said trunk circuit responsive to coded signals from said calling station for selecting one of said first and second billing systems in accordance with the class of call defined by the coded signals received.

2. A communication system having a first switching exchange, a second switching exchange, first subscriber billing means in the first exchange, means located in the first and second exchanges cooperating to form a second subscriber billing means, and means interconnecting the first and second exchanges, said interconnecting means comprising
   means for distinguishing between at least two classes of calls in accordance with digits dialed by a calling subscriber and
   means operated by said distinguishing means for selecting different ones of the first and second billing means for subscriber billing of different classes of calls.

3. A telephone system having
   subscriber stations,
   a first switching exchange for serving calls originated from the stations,
   first means accessible by the first exchange for processing station billing information,
   a second switching exchange,
   second means accessible by the second exchange for processing station billing information,
   a trunk circuit for interconnecting the first and second exchanges in response to a call from one of the stations, and
   means accessible by said first exchange for communicating station identification information to the second processing means, wherein said trunk circuit comprises
   means for translating call digits outpulsed to the second exchange from a calling station to distinguish between a first class of call and a second class of call,
   means responsive to the translating means for selecting the first processing means for a call of the first class, and
   means responsive to the translating means for controlling the communicating means for a call of the second class.

4. The invention of claim 3 wherein said translating means comprises
   means for storing an indication of the class of call from the calling station, and said trunk circuit further comprises
   means responsive to said storing means and to the receipt of a supervisory signal from said second exchange for operating said controlling means for a call of the second class.

5. The invention of claim 3 wherein said selecting means comprises means for transmitting a supervisory signal from the second exchange to the first processing means for a call of the first class.

6. The invention of claim 3 wherein said translating means comprises
   counter means for identifying the digit number of each of a prescribed number of said digits outpulsed to the second exchange,
   means for examining successive ones of the prescribed number of digits for predetermined values dependent on the digit numbers to ascertain the class of call, and
   means for storing an indication of the class of call.

7. The invention of claim 3 wherein
   said selecting means comprises means responsive to said translating means for connecting the second exchange to the first processing means for a call of the first class, and
   said controlling means comprises means responsive to said translating means for connecting the second processing means to the communicating means for a call of the second class.

8. The invention of claim 7 wherein said selecting means comprises means for transmitting supervisory signals from said second exchange to the first processing means for calls of a first class, and
   means for interrupting the transmission of the supervisory signals to the first exchange for calls of a second class.

9. In a telephone system including a first exchange having bulk-billing and subscriber identification apparatus and a second exchange having access to itemized subscriber billing apparatus, the improvement comprising a trunk circuit for interconnecting the first and second exchanges for calls of a first class to be billed by the bulk-billing apparatus and calls of a second class to be billed by the itemized billing apparatus, said trunk circuit comprising, means for distinguishing between said first and second class calls in accordance with digits dialed by a calling subscriber, means for transmitting supervisory signals received from the second exchange to the bulk-billing apparatus for operation thereof in the event of placement of a first class call, and means responsive to a supervisory signal from the second exchange for controlling the outpulsing of subscriber identification information to the second exchange for processing in the itemized billing apparatus in the event of placement of a second class call.

10. The invention set forth in claim 9 wherein said distinguishing means comprises means for detecting a prescribed sequence of said digits defining a special assistance type call.

11. The invention set forth in claim 10 wherein said controlling means comprises means operated by said detecting means for interrupting the transmission of said supervisory signal to the bulk-billing apparatus in the event of a special assistance call, and means enabled by said detecting means and responsive to a receipt of said supervisory signal for operating the identification apparatus to outpulse a calling subscriber's number to the second exchange.

12. In a telephone system having a first switching exchange for serving stations connected thereto, first billing means and station identification apparatus in the first exchange, a second switching exchange having access to second billing means, trunk means interconnecting the first and second exchanges and accessible by said first exchange on receipt of a preliminary digit from a calling one of the stations, the improvement including trunk circuitry in the trunk means comprising means for detecting a prescribed sequence of digits outpulsed to the second exchange from the calling station defining a predetermined class of call, means operated by said detecting means for storing an indication of receipt of said prescribed sequence of digits, means enabled by said storing means when operated and responsive to a signal from said second exchange for activating the identification apparatus to outpulse station identifying information to the second exchange for processing by the second billing means, and means enabled by said storing means when nonoperated for steering supervisory signals from said second exchange to the first billing means for activation thereof.

13. For use in a telephone system having subscribers, first means for billing subscribers for calls of a first class and second means for billing subscribers for calls of a second class, trunk means connectable to a calling one of said subscribers and comprising means for distinguishing between the two classes of calls on the basis of digits dialed by the calling subscriber, and means operated by said distinguishing means for selecting the first and second billing means for respective first and second class calls.

14. The invention of claim 13 wherein said distinguishing means comprises means for translating prescribed ones of the digits and means operated in response to a detection of a predetermined sequence of the digits by said translating means for effecting said selection of said first and second billing means.

15. A trunk circuit for use in a telephone system comprising subscriber stations, a first switching exchange for serving the stations and having access to first station billing means and a second switching exchange having access to second billing means including station identification means, said trunk circuit being operable for interconnecting the first and second exchanges and comprising means for translating call digits dialed by a calling one of the subscribers to distinguish between a first class of call and a second class of call, means for selecting the first billing means in the event of placement of a first class of call, and means for communicating information from the identification means to the second billing means in the event of placement of a second class of call.

16. The invention of claim 15 wherein said translating means comprises means for detecting a prescribed sequence of said digits in predetermined digit positions defining a special assistance class of call.

17. The invention of claim 15 wherein said station identification means is located in the first exchange and said selecting means comprises means operated by said translating means for transmitting a signal from said second exchange to said first billing means to activate the first billing means during a first class of call, and said communicating means includes means responsive to said translating means and to said signal for activating the station identification means during a second class of call.

18. The invention of claim 17 wherein said trunk circuit further comprises alternating current coupling means for providing for the transmission of conversational signals between said first and second exchanges and said transmitting means comprises means operated during a first class of call for bypassing said alternating current coupling means to provide a transmission path for said supervisory signals.

19. A trunk circuit for use in a telephone system having a first switching exchange for serving subscribers connected thereto and including subscriber bulk-billing means and subscriber identification apparatus, a second switching exchange having access to itemized customer billing means, and a tandem exchange for routing calls from said first exchange to said second exchange, said trunk circuit being operable for interconnecting the first and tandem exchanges and comprising means for detecting a prescribed sequence of digits outpulsed to the tandem exchange from a calling subscriber, means enabled by said detecting means upon a receipt of said prescribed sequence of digits to respond to a signal from said second exchange for activating the identification apparatus, thereby to outpulse information identifying the calling subscriber to the second exchange for processing by the itemized billing means, and means controlled by said detecting means in the absence of detecting said prescribed sequence for transmitting signals from said second exchange to the bulk-billing means for activation thereof.

* * * * *